United States Patent [19]
Wendel

[11] 3,833,275
[45] Sept. 3, 1974

[54] FOOTSTEP BEARING
[75] Inventor: Gunther Wendel, Stuttgart, Germany
[73] Assignee: SKF Kugellagerfabriken GmbH, Schweinfurt, Germany
[22] Filed: Mar. 19, 1973
[21] Appl. No.: 342,880

[30] Foreign Application Priority Data
Mar. 24, 1972 Germany............... 7211322[U]

[52] U.S. Cl. ............................................. 308/156
[51] Int. Cl. ........................................ F16c 35/08
[58] Field of Search........................... 308/156, 159

[56] References Cited
UNITED STATES PATENTS
474,286    5/1892   Brewster......................... 308/159
1,803,151  4/1931   Sweet............................. 308/156
3,020,104  2/1962   Nickols........................... 308/159

Primary Examiner—Charles J. Myhre
Assistant Examiner—Frank Susko
Attorney, Agent, or Firm—Murray Schaffer

[57] ABSTRACT

A footstep bearing for journalling the spindle shaft of a spinning and twisting machine comprising a tubular bearing bushing adapted to radially guide the spindle shaft and a bearing block located in the frontal end of the bushing. The block is provided with a step on which a spindle shaft fits and is adapted to absorb the axial thrust of the spindle shaft. The bearing block and the tubular bushing are joined together in a compressive interlocking arrangement such as by swaging, compressing, etc., one of the members.

5 Claims, 3 Drawing Figures

FOOTSTEP BEARING

BACKGROUND OF INVENTION

The present invention relates to footstep bearings for supporting the spindles of spinning and twisting machines and in particular to a two piece footstep bearing having improved characteristics of construction and function.

In the known footstep bearings of this art, as for example those shown in German Pat. publications DOS Nos. 1,785,061 and 1,911,025, the bearing parts are built and arranged bodily separable from one another and special means must be provided to secure and mount each part in the spindle bearing housing. This arrangement is further characterized by the fact that the bearing portion absorbing the axial thrust of the spindle is worn out more readily than the other portions of the bearing. Consequently, the bearing portion is made to be easily disengageable so that it may be easily removed and exchanged. On the other hand, in one piece bearings, the cost of manufacture is high, since it is difficult to accurately form and work the race surface which absorbs the axial thrust of the spindle, because this surface lies deeply within the body of the bearing.

It is the object of the present invention to provide a two piece footstep bearing which overcomes the difficulties of the prior art.

It is a further object of the present invention to provide a two piece footstep bearing and its method of manufacture which is simple and economical to manufacture and install.

It is a particular object of the present invention to provide a two piece footstep bearing in which the pieces are held fast together to form a unitary assembly.

It is still another object of the present invention to provide a method for manufacturing footstep bearings in which the bearing surface or step is formed simultaneously with the fastening or securement of the two pieces together.

It is another object of the present invention to provide a two piece footstep bearing which may be mounted in as simple and easy a manner in the spindle housing as is the case with the present one piece units.

It is another object of this invention to provide a two piece footstep bearing in which each piece may be made of material suited and chosen specifically of a strength matching the load.

SUMMARY OF INVENTION

According to the present invention a footstep bearing is provided comprising a first part namely, a tubular bushing, adapted to radially guide the spindle shaft and a second part namely, a bearing step located in the frontal end of the bushing. The two parts are joined together in a compressive interlocking arrangement to provide a unitary assembly. Preferably the interlocking is accomplished by compressing the bearing step so that it is swaged or press fit into the bushings, the compression being made, for example, by stamping or pressing the material at the same time that the race surface for the spindle shaft is formed. In this manner the method of manufacture combines several heretofore independent steps and results in considerable economy of cost, time and effort.

The bushing is preferably formed with key ways, recesses or grooves which receive the material of the bearing step which is upset or deformed by the compression, so that a very secure interlocking is obtained. Such recesses or grooves may be radial channels. A particular advantage of the present invention is that the bearing step part can thus be arranged entirely within the bearing bushing.

The assembled two piece footstep bearing may be combined with other structural elements of the spindle bearings, for example, with a centering tube. Preferably, the exterior surface of the bearing bushing is provided with an annular groove, into which a conforming head or band made on the centering tube can fit, in a resilient manner.

Full details of the present invention follow in the subsequent description and are shown in the accompanying drawings.

DESCRIPTION OF INVENTION

Figure 3:
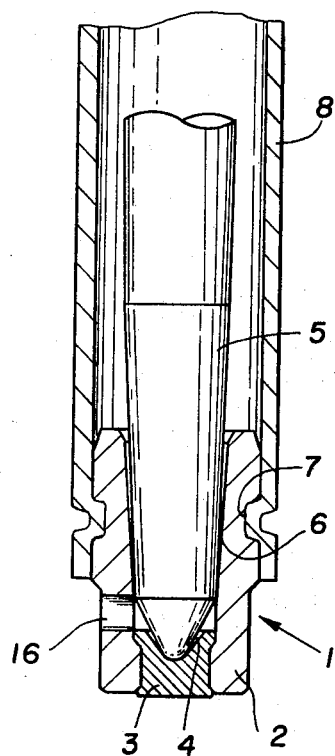
FIG. 3 is a similar view showing the two parts in completed assembly and the compressive interlocking engagement.

The completed footstep bearing is generally depicted in FIG. 3 by the numeral 1 and is formed having a first part namely, a bearing bushing 2 and a second part namely, a bearing block 3 which are securely and permanently force fit together in a manner to be hereinafter described. The upper frontal end of the bearing block 3 is shaped to provide a conical bearing step 4 on which the lower end of the shaft 5 of a spindle rests. The step 4 absorbs the axial thrust of the spindle during operation. The shaft 5 is also guided radially by the upwardly extending tubular bearing bushing 2, the inner surface 6 of which conformingly surrounds and engages the lower portion of the shaft 5. The outer surface of the bushing 2 is provided with a circumferential groove 7 which holds the centering tube 8 which is itself provided with a corresponding inwardly directed annular bead, band or the like which compresses over the bushing in a resilient manner. The centering tube 8 is secured within a bolster (not shown) which is mounted on the machine frame. The assembly may include other conventional means, such as resilient vibration dampeners, spaces, etc. Since the present invention is concerned solely with the form of the step bearing at the lower end, these means are not shown, for the sake of brevity.

Figure 1:
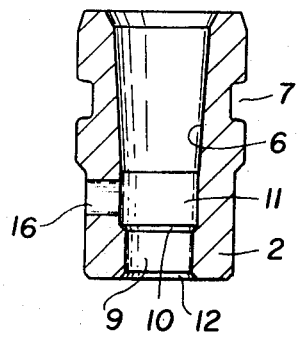
FIG. 1 is a longitudinal section of the bearing bushing.
Figure 2:
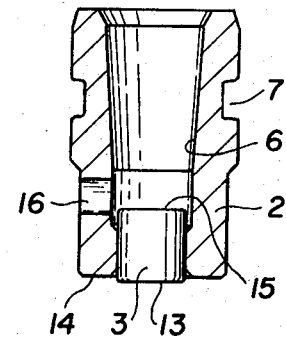
FIG. 2 is a section similar to FIG. 1 showing the block from which the bearing step is formed, inserted in the bushings.

The formation of the step 4 and the securement to the block 3 to the bushing 2 is depicted in FIGS. 1 and 2. The bushing 2 is formed at its lower end with a cylindrical opening 9 having an upper circumferential edge 10 bevelled outwardly toward an inner cylindrical portion 11. The opposite or outer edge 12 is similarly countersunk in an outward bevel. As seen in FIG. 2, the bearing block 3 is originally provided as a cylindrical slug having an axial length greater than the axial length of the cylindrical opening 9. The cylindrical slug or block 3 is inserted into the opening 9 so that relative to one another the outer flat end 13 of the block 3 extends below the plane 14 of the lower end of the bushing 2, while the inner flat end 15 of the block 3 extends into the cylindrical section 11. Thereafter, the bushing 2 and inserted block 3 are set on a conforming supporting surface, such as an anvil, and a stamping instrument having a die surface conforming to the conical step 4 is placed on the flat inner end 15. Pressure is applied on the stamping instrument by a conventional hammer, press or the like to cause the material of the block 3 to be deformed so that simultaneously with the creation of the conical step 4, the material is displaced and swaged to fill the countersunk edges 11 and 12 as seen in FIG. 3. As a result of the compression, the bearing block 3 lies with its outer cylindrical face in secure engagement with the face of the opening 9 so that the entire block 3 is immovably held in the bushing 2.

As the cross hatchings in FIG. 3 show, the bushing 2 and block 3 can be made of different materials as for example steel and bronze respectively. This provides an economical construction while providing the axial thrust bearing block of a strong yet low friction material. Other materials can also be used, if desired, however, it is necessary in selecting the material for special uses that consideration be given to need for the material to be stamped or deformed into the necessary shape for the bearing step and press fit. Aside from this, consideration need only be given to the strength of the material to absorb the strong strain of operation. The material can be further chosen so that both the bushing and the bearing block have substantially the same life span. As a consequent, both parts will be replaceable simultaneously rather than separately.

As seen in the figures, the bushing 2 is preferably provided with a bore 16 extending transversely into the area 11. The bore 16 enables lubricant to pass from the bolster or housing of the spindle into the bushing 2, to lubricate the axial end of the shaft 5. The means for lubrication, bolster, housing etc., are well known in this art and require no further description.

The objects and numerous advantages as enumerated above have all been obtained by the present invention as described. Advantageously the method of assembling the two pieces of the bearing, as by swaging and compressing provide a unitary assembly which can easily be handled, stored and installed without any difficulty, in exactly the same way as an ordinary one piece footstep bearing. A further advantage accrues from the fact that each part may be separately formed from material chosen as most suits its particular function. The bushing may be separately worked and formed. Since it is tubular, it is much easier in this way.

Since various modifications and changes may be made it is intended that the present disclosure be viewed as illustrative only and not as limiting of the invention.

What is claimed:

1. A footstep bearing for journalling the spindle shaft of a spinning and twisting machine comprising a tubular bearing bushing adapted to radially guide the spindle shaft and a bearing step located in the frontal end of said bushing adapted to absorb the axial thrust of said spindle shaft, said bearing step being compressed within said tubular bushing, said bushing being provided with recesses for receiving the material of the bearing step displaced by the compression thereof so as to be joined together in a compressive interlocking arrangement.

2. The bearing according to claim 1 wherein the bearing bushing is provided with a cylindrical portion for receiving said step and the recesses comprise circumferential bevelled surfaces countersunk at each end of the cylindrical portion.

3. The bearing according to claim 1 including a centering tube adapted to support said bearing, said bearing bushing having a circumferential groove and said centering tube having a cooperating member adapted to fit within said groove and secure said bushing to said centering tube.

4. The bearing according to claim 1 wherein the materials from which the bushing and the bearing step are made are different.

5. The method of assembling a footstep bearing for the spindle shaft of a spinning and twisting machine, said footstep bearing having a tubular bushing shaped to radially guide the spindle shaft and a step for absorbing the axial thrust of said spindle shaft comprising the step of forming said bushing with a cylindrical end, having at least one recess, providing a cylindrical block within the cylindrical end of said bushing, and compressing said block with a shaped tool to form an axial step conforming to the spindle shaft and to simultaneously deform said block to fill said cylindrical bushing end and said recess to be thereby secured in compressive interlocked engagement therewith.

* * * * *